(12) United States Patent
Silverbrook (10) Patent No.: US 6,488,361 B2
(45) Date of Patent: Dec. 3, 2002

(54) INKJET PRINTHEAD THAT INCORPORATES CLOSURE MECHANISMS

(75) Inventor: Kia Silverbrook, Balmain (AU)

(73) Assignee: Silverbrook Research Pty Ltd., Balmain (AU)

( * ) Notice: Subject to any disclaimer, the term of this patent is extended or adjusted under 35 U.S.C. 154(b) by 0 days.

(21) Appl. No.: 09/900,178

(22) Filed: Jul. 9, 2001

(65) Prior Publication Data

US 2001/0040607 A1 Nov. 15, 2001

Related U.S. Application Data

(63) Continuation-in-part of application No. 09/112,808, filed on Jul. 10, 1998, now Pat. No. 6,302,528.

(30) Foreign Application Priority Data

Jul. 15, 1997 (AU) .............................................. PO7991
Jul. 15, 1997 (AU) .............................................. P08068

(51) Int. Cl.[7] ............................... B41J 2/14; B41J 2/04; B41J 2/05

(52) U.S. Cl. ............................... 347/54; 347/47; 347/56
(58) Field of Search ............................... 347/20, 44, 47, 347/54, 56

(56) References Cited

U.S. PATENT DOCUMENTS

| 4,370,662 A | | 1/1983 | Hou et al. | |
| 5,994,816 A | * | 11/1999 | Dhuler et al. | ................ 310/307 |
| 6,302,528 B1 | * | 10/2001 | Silverbrook | ................ 347/54 |

* cited by examiner

Primary Examiner—John Barlow
Assistant Examiner—An H. Do (57) ABSTRACT

An ink jet printhead that is manufactured in accordance with an integrated circuit fabrication technique includes a substrate. A plurality of nozzle arrangements are positioned on the substrate. Each nozzle arrangement includes nozzle chamber walls that define a nozzle chamber having an inlet that is in fluid communication with a pulsed ink supply. A closure mechanism is positioned on the substrate and is operable between a closed condition in which the closure mechanism serves to close the inlet and an open condition in which ink is permitted to pass into the nozzle chamber.

10 Claims, 10 Drawing Sheets

INKJET PRINTHEAD THAT INCORPORATES CLOSURE MECHANISMS

This is a C-I-P of application Ser. No. 09/112,808, filed Jul. 10, 1998, now U.S. Pat. No. 6,362,528.

REFERENCES TO U.S. APPLICATIONS

This application is a continuation-in-part application of U.S. Pat. No. 6,302,528. U.S. Pat. Nos. 6,302,528, 6,257,704, 6,264,306, 6,234,610, 6,247,792, 6,264,307 and 6,254,220 are hereby incorporated by reference.

FIELD OF THE INVENTION

This invention relates to ink jet printheads. More particularly, this invention relates to an ink jet printhead that incorporates closure mechanisms.

BACKGROUND TO THE INVENTION

The Applicant has invented an ink jet printhead that is capable of generating text and images at a resolution of up to 1600 dpi.

In order to achieve this, the Applicant has made extensive use of micro electro-mechanical systems technology. In particular, the Applicant has developed integrated circuit fabrication techniques suitable for the manufacture of such printheads. The Applicant has filed a large number of patent applications in this field, many of which have now been allowed.

The printheads developed by the Applicant can include up to 84000 nozzle arrangements. Each nozzle arrangement has at least one moving component that serves to eject ink from a nozzle chamber. The components usually either act directly on the ink or act on a closure which serves to permit or inhibit the ejection of ink from the nozzle chamber.

The moving components within the printheads are microscopically dimensioned. This is necessary, given the large number of nozzle arrangements per printhead. The Applicant has spent a substantial amount of time and effort developing configurations for such printheads.

One of the reasons for this is that, as is known in the field of integrated circuit fabrication, cost of on-chip real estate is extremely high. Furthermore, it is important that levels of complexity are kept to a minimum since these significantly increase the cost of fabrication.

Integrated circuit fabrication techniques involve what is generally a deposition and etching process. As a result, devices which are manufactured in accordance with such techniques are usually, of necessity, in a layered construction. Furthermore, it is important to develop a configuration where a high number of devices can be fabricated per unit area of chip surface.

A problem associated with such a high number of nozzle arrangements is that ink must be selectively physically ejected from each of the nozzle arrangements. This can result in excessive expenditure of energy. Furthermore, the requirement of having an ink mover in each nozzle chamber can result in a printhead with an unacceptably high level of complexity. Applicant has conceived the present invention in order to address this issue.

SUMMARY OF THE INVENTION

According to a first aspect of the invention there is provided an ink jet printhead that is manufactured in accordance with an integrated circuit fabrication technique, the ink jet printhead comprising:

a substrate; and a plurality of nozzle arrangements positioned on the substrate, each nozzle arrangement comprising:
nozzle chamber walls that define a nozzle chamber having an inlet for fluid communication with a pulsed ink supply; and
a closure mechanism that is positioned on the substrate and is operable between a closed condition in which the closure mechanism serves to close the inlet and an open condition in which ink is permitted to pass into the nozzle chamber.

According to a second aspect of the invention, there is provided an ink jet printhead that comprises a substrate;

an ink reservoir arranged on the substrate;

a plurality of nozzle arrangements positioned on the substrate, each nozzle arrangement comprising nozzle chamber walls that define a nozzle chamber having an inlet that is in fluid communication with the ink reservoir and a closure mechanism that is positioned on the substrate and is operable between a closed condition in which the closure mechanism serves to close the inlet and an open condition in which ink is permitted to pass into the nozzle chamber; and a pressurizing mechanism that is operatively arranged with respect to the ink reservoir, the pressurizing mechanism being configured to pressurize ink within the reservoir in a pulsed manner to generate pressure pulses to eject ink from the nozzle chambers on operation of the pressurizing mechanism, when the closure mechanisms are in the open condition.

According to a third aspect of the invention, there is provided a method of printing with an ink jet printhead having a substrate, a plurality of nozzle arrangements positioned on the substrate, each nozzle arrangement having nozzle chamber walls that define a nozzle chamber having an inlet, a closure mechanism that is positioned on the substrate and that is operable between a closed condition in which the closure mechanism serves to close the inlet and an open condition in which ink is permitted to pass into the nozzle chamber, the method comprising the steps of:

applying pressure pulses to ink supplied to each nozzle arrangement; and activating closure mechanisms of selected nozzle arrangements while applying such pressure pulses, so that the closure mechanisms are moved into their open conditions permitting ink to be ejected from the nozzle chambers of the selected nozzle arrangements.

The invention is now described, by way of example, with reference to the accompanying drawings. The specific nature of the following description is not to be construed as limiting the broad nature of this summary in any way.

DETAILED DESCRIPTION OF THE DRAWINGS

Figure 1:
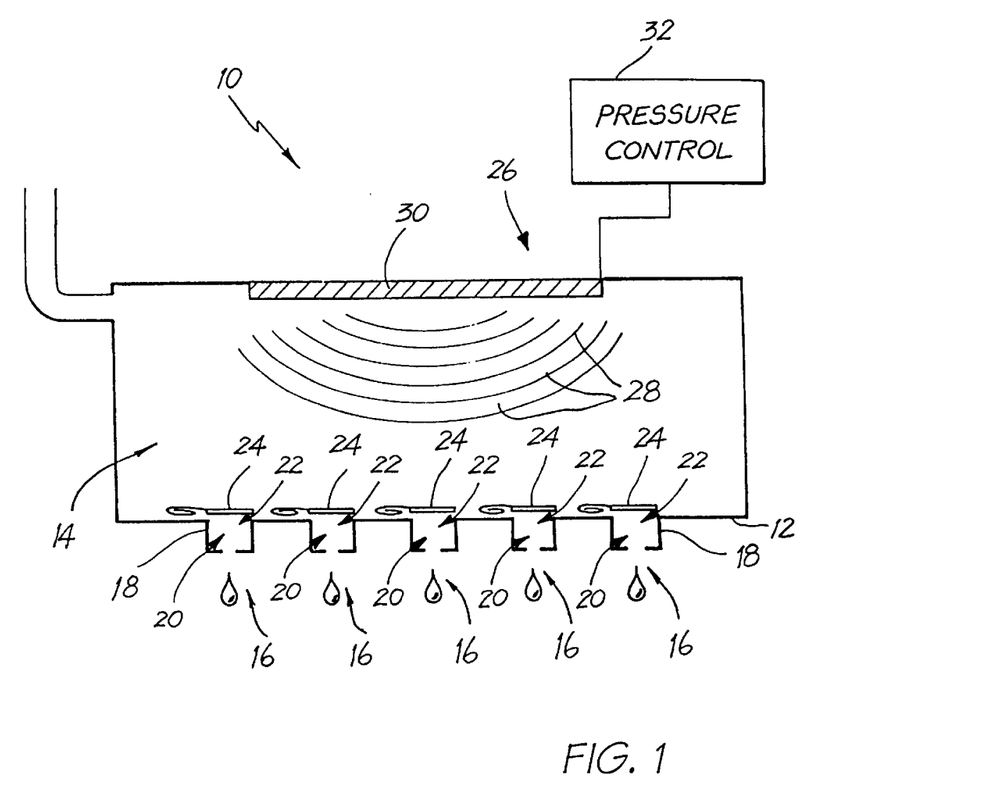
FIG. 1 shows a schematic view of a first embodiment of an ink jet printhead, in accordance with the invention.

In FIG. 1, reference numeral 10 generally indicates an ink jet printhead, in accordance with the invention.

The ink jet printhead 10 is the product of an integrated circuit fabrication technique. In particular, the ink jet printhead 10 is in the form of a micro electro-mechanical system.

The printhead 10 includes a substrate 12. An ink reservoir 14 is arranged on the substrate 12. A plurality of nozzle arrangements 16 are positioned on the substrate 12. Each nozzle arrangement 16 has nozzle chamber walls 18 that define a nozzle chamber 20 having an inlet 22 that is in fluid communication with the ink reservoir 14. Each nozzle arrangement 16 includes a closure mechanism 24 that is positioned on the substrate 12 and is operable between a closed condition in which the closure mechanism 24 serves to close the inlets 22 and an open condition in which ink is permitted to pass into the nozzle chamber 20.

The printhead 10 includes a pressurizing mechanism 26 which is configured to pressurize ink within the reservoir 14 repeatedly and in a pulsed manner to generate pressure pulses, indicated schematically at 28, which are sufficient to eject ink from the nozzle chambers 20 when the closure mechanisms 24 are in the open condition.

The pressurizing mechanism 26 is in the form of a piezoelectric pressure transducer 30. The pressure transducer 30 is connected to a pressure control mechanism 32 which serves to activate the transducer 30 so that the transducer 30 produces pressure pulses 28 at a predetermined frequency.

Figure 2:
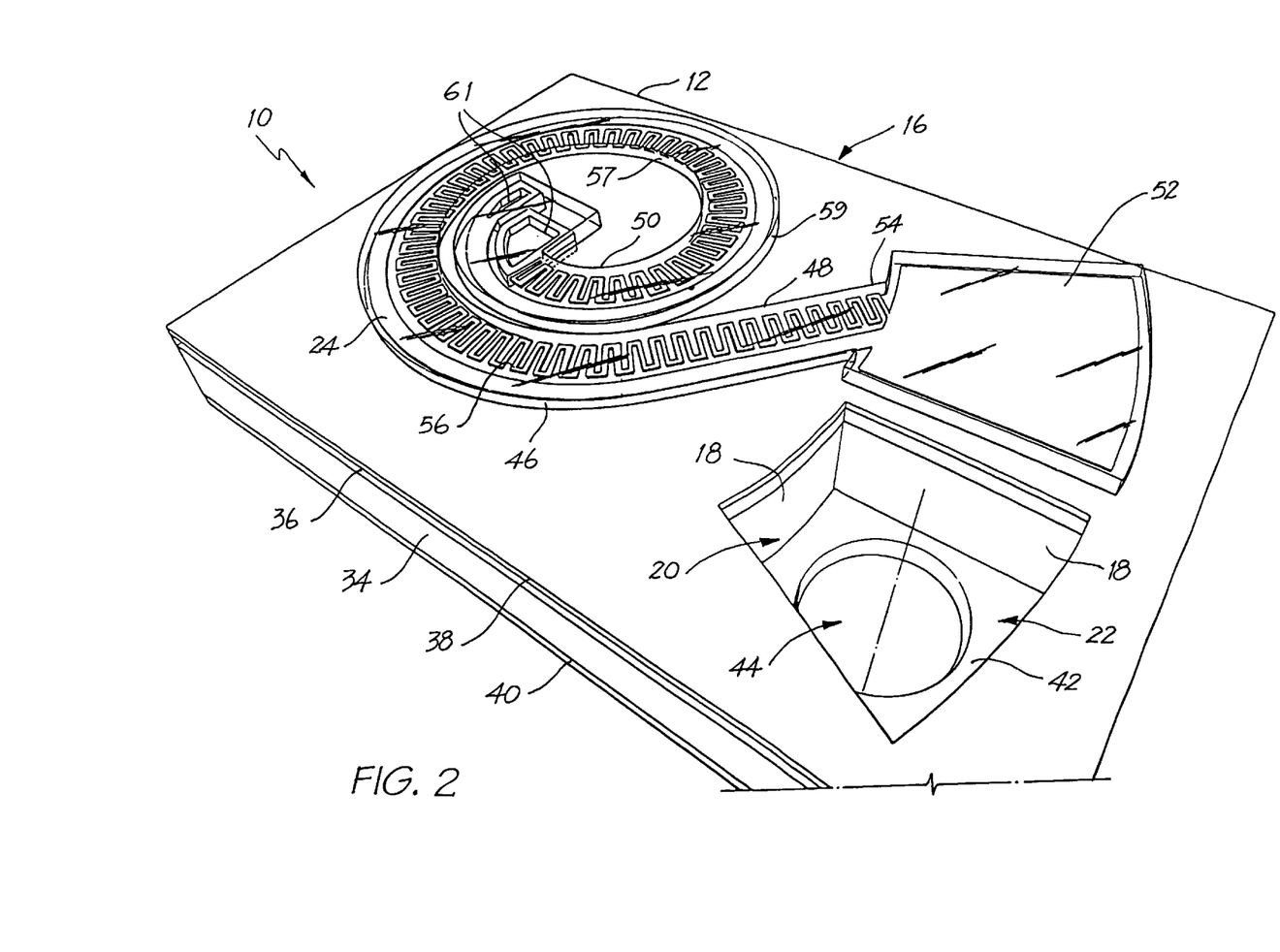
FIG. 2 shows a three dimensional view of a nozzle arrangement of the ink jet printhead of FIG. 1.

A part of the printhead 10 incorporating one of the nozzle arrangements 16 is shown in further detail in FIG. 2.

The substrate 12 includes a wafer substrate 34. A drive circuitry layer 36 is positioned on a back side of the wafer substrate 34 and an ink passivation layer 38 is positioned on the drive circuitry layer 36. An etch stop layer 40 is positioned on a front side of the wafer substrate 34. The layers 36, 38 and the wafer substrate 34 are etched down to the etch stop layer 40 to define the nozzle chamber 20 and the nozzle chamber walls 18. The etch stop layer 40 thus defines a roof wall 42 for the nozzle chamber 20. The roof wall 42 is etched to define an ink ejection port 44.

It will thus be appreciated that etching of the nozzle chamber 20 results in the creation of the ink inlet 22.

The nozzle arrangement 16 includes an actuator 46. The actuator 46 includes a coiled actuator arm 48 which is of a material having a coefficient of thermal expansion which is such that, on expansion of the material by the application of heat, such expansion can be harnessed to perform work.

An inner end 50 of the actuator arm 48 is fast with the ink passivation layer 38. A shutter 52 is fast with an outer end 54 of the actuator arm 48. The shutter 52 is dimensioned so that it can span the inlet 22 to close the inlet 22.

The ink reservoir 14 is positioned on the back of each nozzle arrangement 16. Thus, ink within the ink reservoir 14 is in contact with the ink passivation layer 38, the actuator arm 48 and the shutter 52.

The actuator arm 48 and shutter 52 are displaceable between a closed condition in which the shutter 52 spans the inlet 22 to close the inlet 22 and an open condition in which ink within the reservoir 14 is permitted to enter the nozzle chamber 20.

The actuator 46 includes a heater element 56 which is positioned within the actuator arm 48. The heater element 56 is positioned to be closer to an inner side 57 of the actuator arm 48 than to an outer side 59 of the actuator arm 48. It will thus be appreciated that, when the heater element 56 is heated, differential expansion of the material of the actuator arm 48 occurs, resulting in a partial uncoiling of the actuator arm 48. This partial uncoiling serves to displace the shutter 52. Cooling and subsequent contraction of that region of the actuator arm 48 which is heated, results in the actuator arm 48 moving back into its fully coiled state. This partial uncoiling and return is used to displace the shutter 52 between its open and closed conditions.

The heater element 56 is connected to the drive circuitry layer 36 with suitable vias 61 extending through the ink passivation layer 38 and connected to the drive circuitry layer 36.

It will thus be appreciated that by connecting the drive circuitry layer 36 to a suitable control system, the shutters 52 can be actuated selectively depending on the operation of the pressure transducer 30 to permit ink to be ejected from the nozzle chambers 20, via the ink ejection ports 44.

In FIGS. 3 to 8, the process of ejecting a drop of ink is described.

Figure 3:
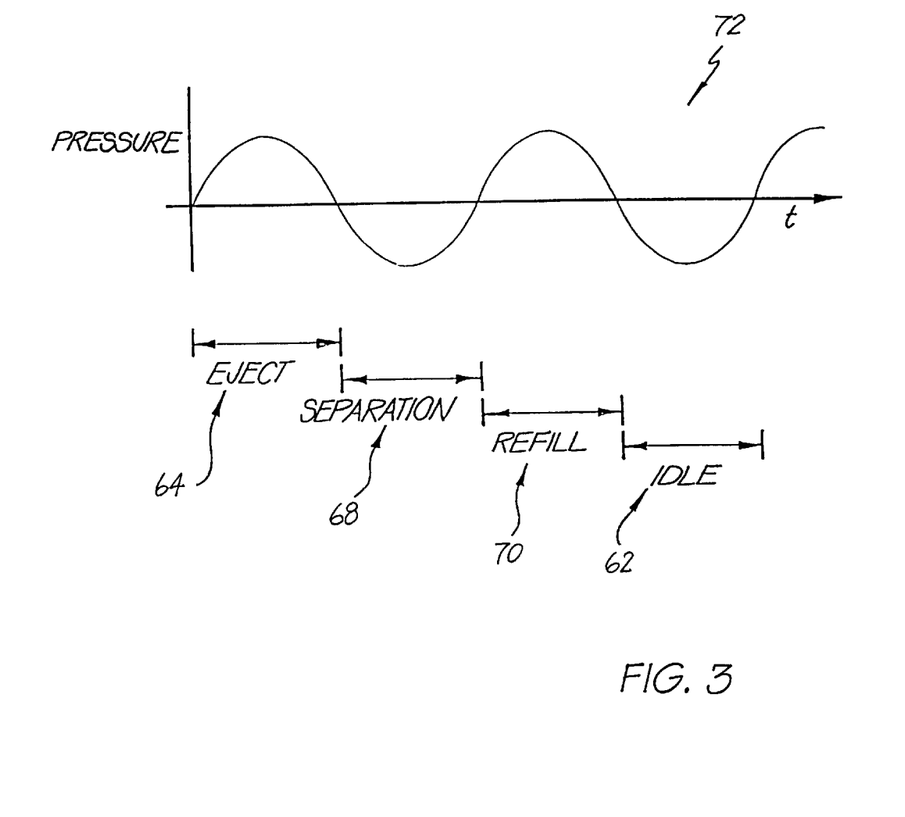
FIG. 3 shows a graphical view of varying pressure within each nozzle chamber of the ink jet printhead of FIG. 1.

FIG. 3 indicates, graphically, pressure change within the nozzle chamber 20 during and subsequent to a pressure pulse 28 generated by the transducer 30.

Figure 4:
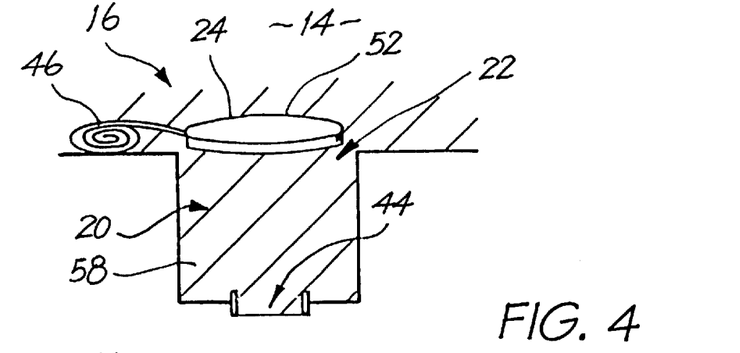
FIG. 4 shows an idle stage in the operation of the nozzle arrangement of the ink jet printhead of FIG. 1.

In FIG. 4, the shutter 52 is in its closed condition and the nozzle chamber 20 is filled with ink 58. This is referred to as an idle stage 62 in FIG. 3.

Figure 5:
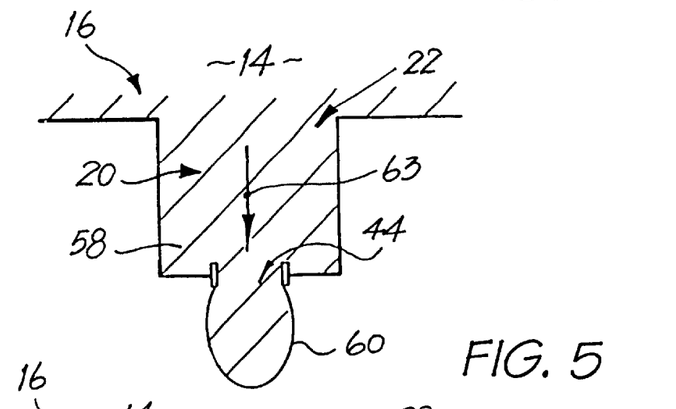
FIG. 5 shows an eject stage in the operation of the nozzle arrangement.

In FIG. 5, an ejection stage is initiated. This occurs by the displacement of the actuator 46 into its open condition. A subsequent pulse 28 generated by the transducer 30 results in the displacement of the ink 58 in the direction of an arrow 63 and in the in the creation of a drop 60 of the ink 58. This is referred to as the eject stage 64 in FIG. 3. This is shown in FIG. 5.

Figure 6:
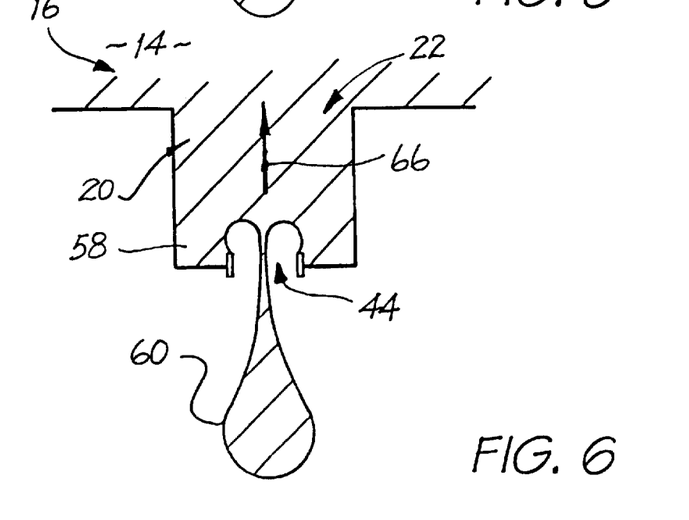
FIG. 6 shows a pre-separation stage of operation of the nozzle arrangement.

Subsequent to the pulse 28, the quantity of ink 58 in the nozzle chamber 20 is reduced. This results in a drop in ink pressure in the nozzle chamber 20, as shown in FIG. 6. This drop in ink pressure results in the ink 58 moving in the direction of the arrow 66. Thus, the drop in pressure results in separation of the drop 60. This is indicated as a separation stage 68 in FIG. 3.

Figure 7:
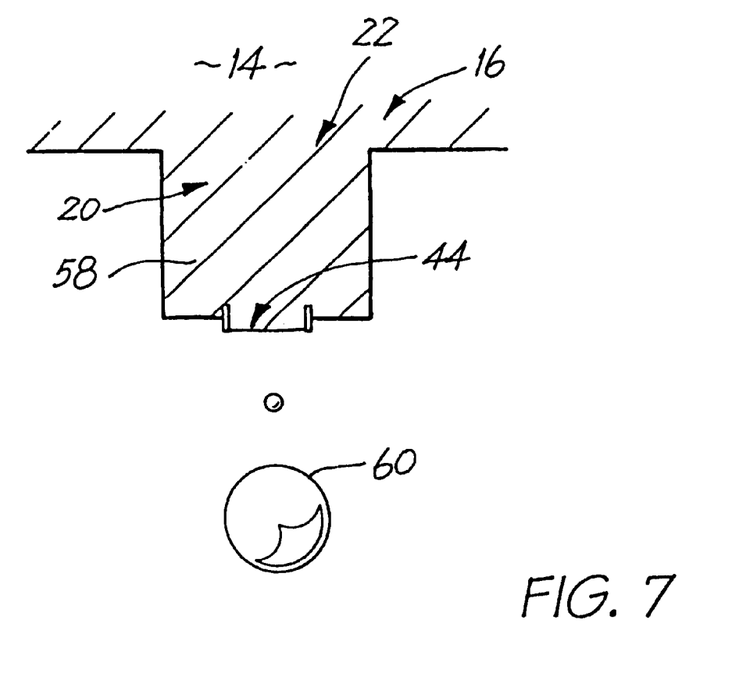
FIG. 7 shows a separation stage of operation of the. nozzle arrangement.

Once the drop 60 has separated from the remainder of the ink 58 within the nozzle chamber 20, the reduced pressure within the nozzle chamber 20 results in a gradual refilling of the nozzle chamber 20, as shown in FIG. 7. This is referred to as a refill stage 70 in FIG. 3.

Figure 8:
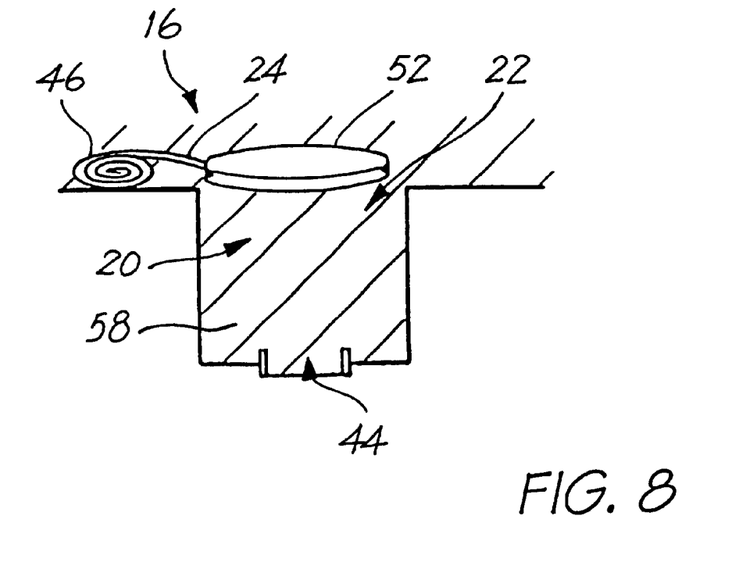
FIG. 8 shows an idle stage of operation of the nozzle arrangement.

Subsequent to the refill stage 70, the shutter 52 is returned to its closed condition as shown in FIG. 8.

A pressure/time graph 72 in FIG. 3 indicates a relationship between pressure and time within the nozzle chamber 20. As can be seen from the graph 72, the relationship is represented by a sine curve.

Figure 9:
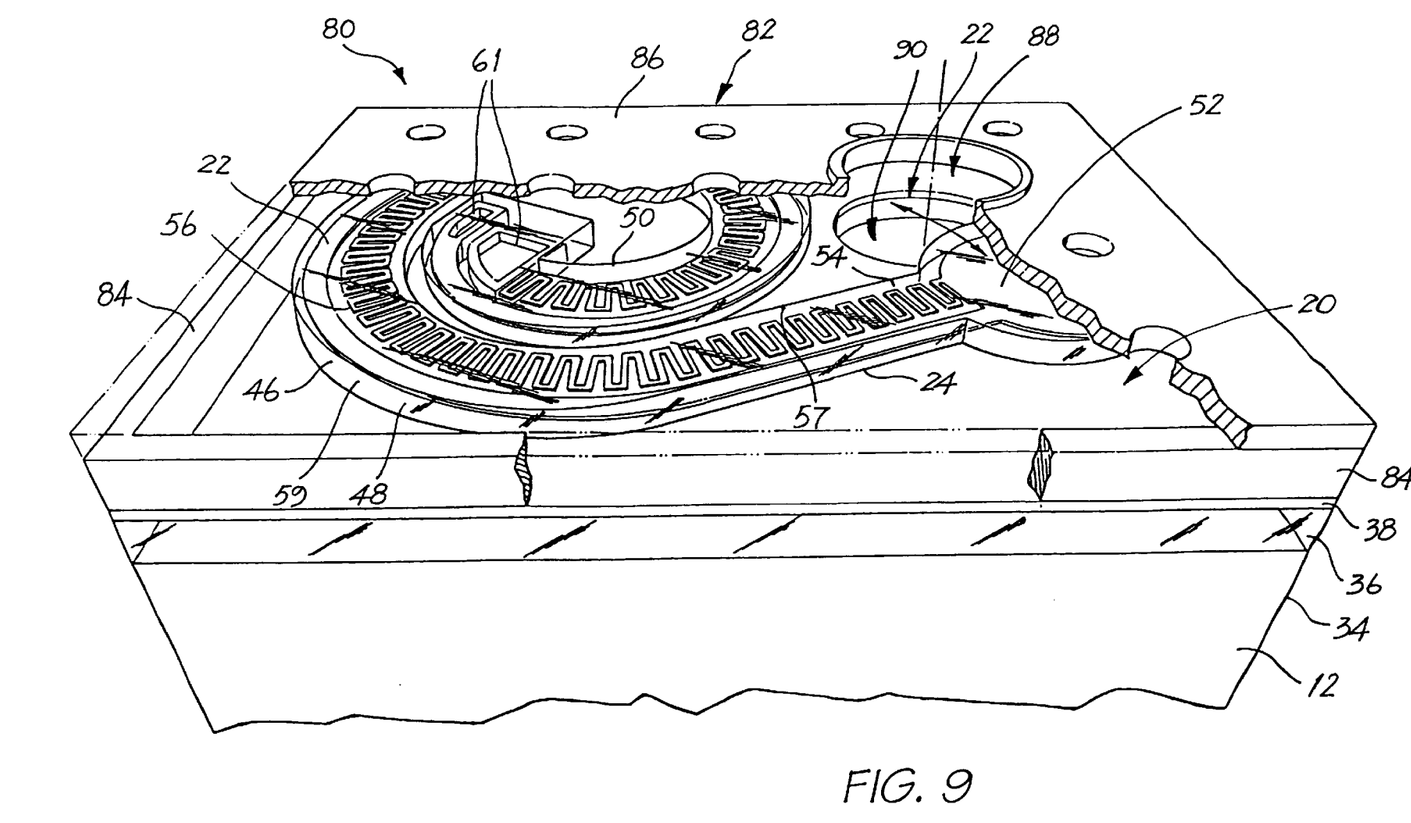
FIG. 9 shows a three dimensional, partly sectioned view of part of a second embodiment of an ink jet printhead, in accordance with the invention.

In FIG. 9, reference numeral 80 generally indicates a second embodiment of part of a printhead, in accordance with the invention. With reference to FIGS. 1 to 8, like reference numerals refer to like parts, unless otherwise specified.

Operation of a nozzle arrangement 82 of the printhead 80 is substantially the same as that of the nozzle arrangement 16. However, the configuration of the nozzle arrangement 82 differs somewhat from that of the nozzle arrangement 16.

With the printhead 80, the drive circuitry layer 36 is positioned on a front side of the wafer substrate 34. As before, the ink passivation layer 38 is positioned on the drive circuitry layer 36.

Nozzle chamber walls 84 are positioned on the ink passivation layer 38 and a roof wall 86 spans the nozzle chamber walls 84. The roof wall 86 defines an ink ejection port 88. The actuator 46 is substantially unchanged. However, the actuator 46 is positioned within the nozzle chamber 20. The nozzle chamber 20 is in fluid communication with an ink inlet channel 90 extending through the wafer substrate 34.

The ink inlet channel 90 is in fluid communication with the ink reservoir 14 so that ink within the nozzle arrangement 82 can be pressurized with the transducer 30.

Figure 10:
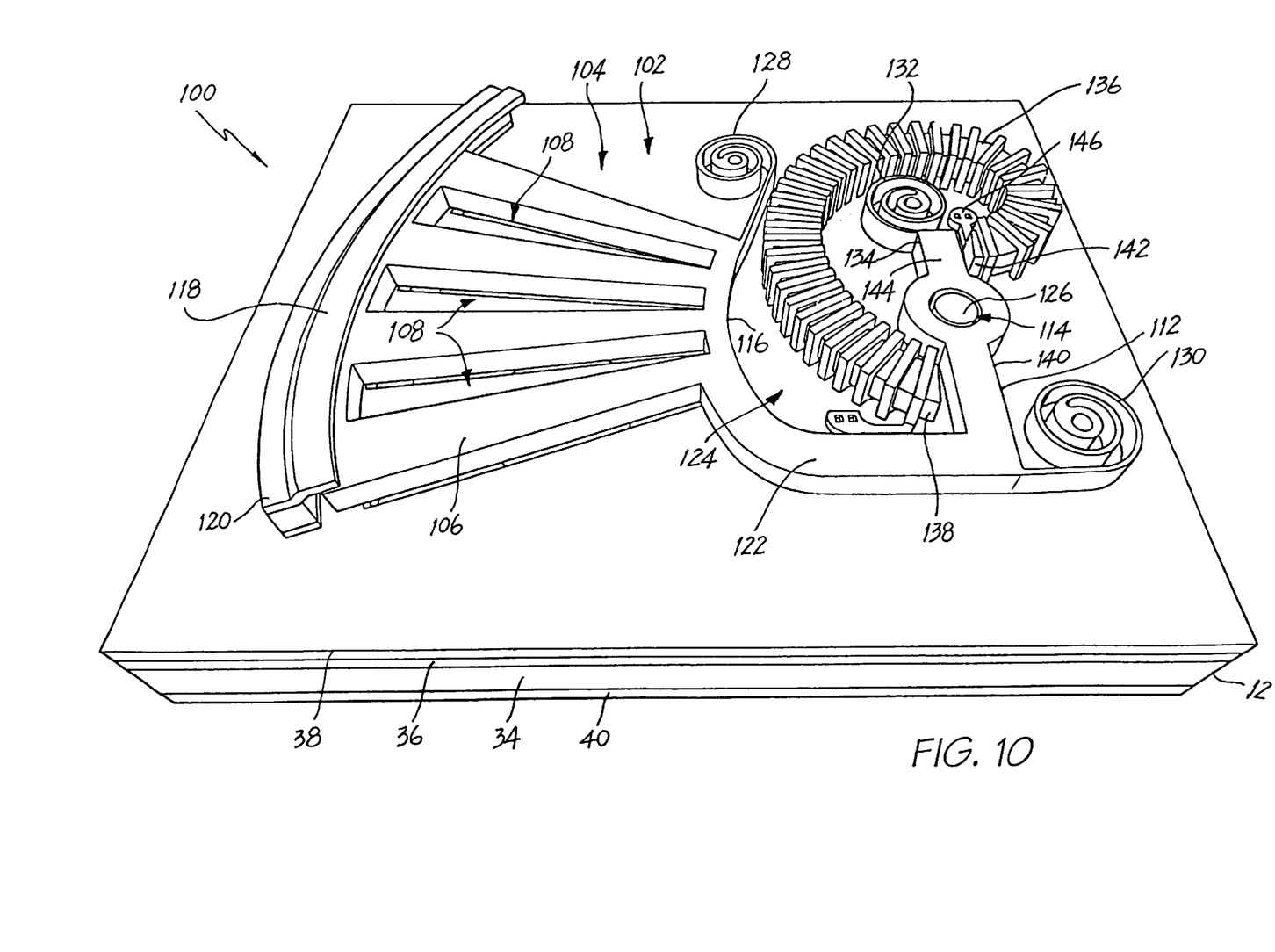
FIG. 10 shows a three dimensional view of part of a third embodiment of an ink jet printhead, in accordance with the invention, with a closure mechanism of a nozzle arrangement in a closed condition.
Figure 11:
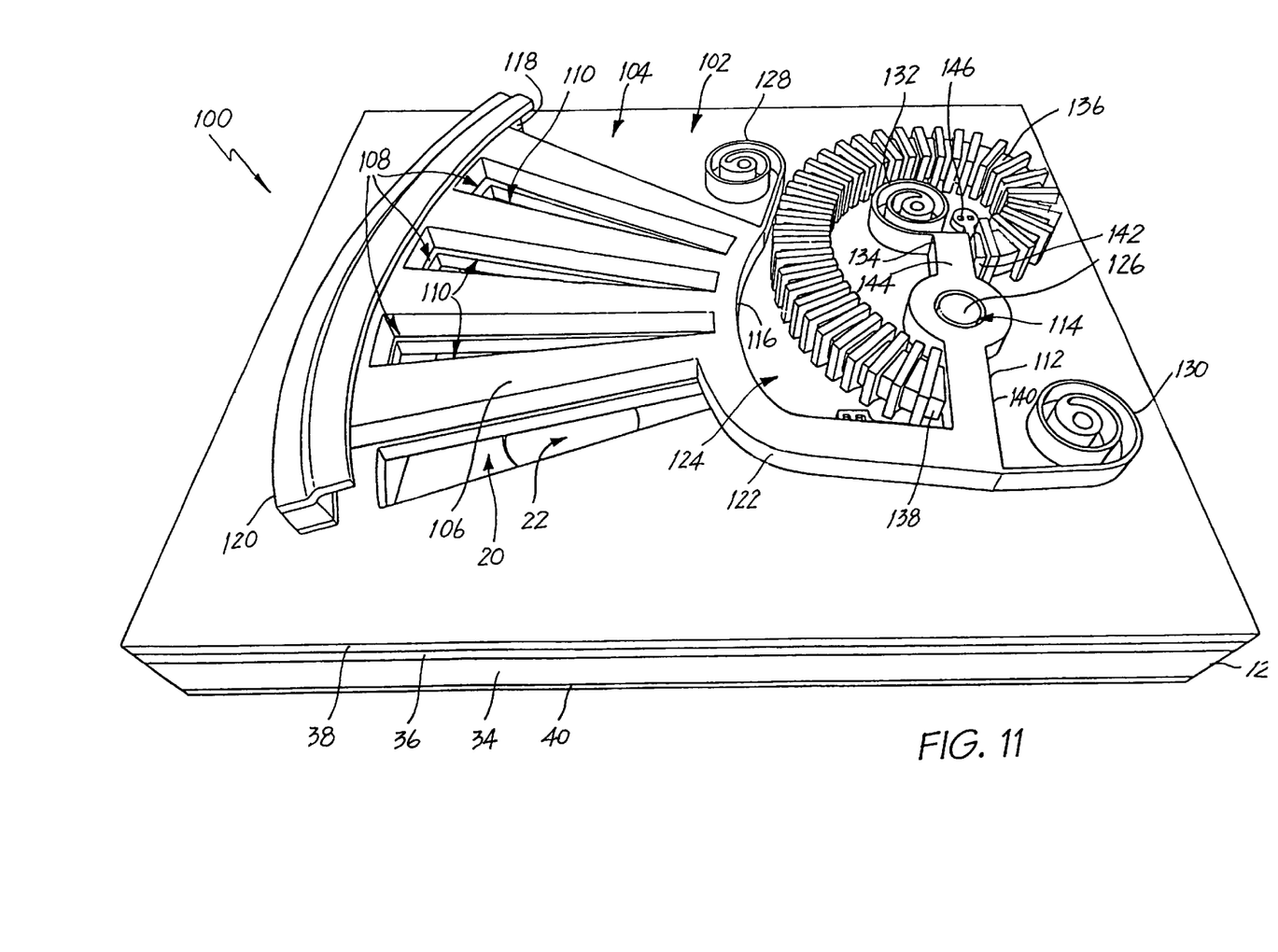
FIG. 11 shows the nozzle arrangement of FIG. 10 with the closure mechanism in an open condition.

In FIG. 10 and FIG. 11, reference numeral 100 generally indicates a third embodiment of part of a printhead, in accordance with the invention. With reference to FIGS. 1 to 9, like reference numerals refer to like parts, unless otherwise specified.

A nozzle arrangement 102 of the printhead 100 has a substantially different configuration to the nozzle arrangements 16, 82.

A closure mechanism 104 of the nozzle arrangement 102 includes a shutter 106 that has a plurality of shutter openings 108 defined therein. The inlet 22 is defined by a plurality of inlet openings 110 which correspond with each shutter opening 108. The shutter 106 is displaceable between a closed condition shown in FIG. 10 in which each shutter opening 108 is out of register with its corresponding inlet opening 110 and an open position shown in FIG. 11 in which each shutter opening 108 is in register with its associated inlet opening 110. It will be appreciated that this has the advantage that the extent of movement required is less than that which would be required without the inlet and shutter openings 110, 108.

A shutter 106 includes a pair of opposed end portions 116, 118. The end portion 118 is arcuate. An arcuate guide formation 120 is positioned on the ink passivation layer 38, the end portion 118 being slidably engaged with the guide formation 120 to ensure that displacement of the shutter 106 is arcuate and consistent.

A connecting arm 122 is attached to the end portion 116 to extend generally at right angles with respect to the end portion 116. A pivot arm 112 is connected to an end of the connecting arm 122 to extend substantially at right angles with respect to the connecting arm 122. It follows that the end portion 116, the connecting arm 122 and the pivot arm 112 partially enclose a region 124.

A pivot opening 114 is defined in the pivot arm 112. A pivot pin 126 extends from the passivation layer 38 through the pivot opening 114. It follows that the pivot arm 112, and thus the shutter 106, is pivotally mounted on the passivation layer 38.

A first coil spring 128 is connected to the end portion 116 and to the passivation layer 38. A second coil spring 130 is connected to a point defined between the connecting arm 122 and the pivot arm 112. A third coil spring 132 is connected to a free end 134 of the pivot arm 112. The springs 128, 130, 132 are configured so that the shutter 106 is biased into the open condition shown in FIG. 10.

An electromagnet 136 positioned on the layer 38. The electromagnet 136 is elongate, with one end 138 positioned in the region 124, proximate the pivot arm 112, on a side 140 of the pivot opening 114 proximate the connecting arm 122. An opposed end 142 of the electromagnet 136 is positioned outside the region 124, proximate the pivot arm 112 on an opposed side 144 of the pivot opening 114.

The electromagnet 136 is electrically connected to the drive circuitry layer 36 with suitable vias 146. The electromagnet 136 is configured to define a magnetic pole at each end 138, 142 when activated by an electrical current from the drive circuitry layer 36.

At least the pivot arm 112 incorporates a material that can be influenced by a magnetic field. For example the pivot arm 112 can have a soft iron core that is coated with ink passivation material such as silicon nitride.

As can be seen in FIG. 10, when the electromagnet 136 is inoperative, the ends 138 and 142 are spaced from the respective sides 140, 144 of the pivot opening 114. However, once the electromagnet 136 is activated, as can be seen in FIG. 11, the pivot arm 112 is acted upon so that the sides 140, 144 are drawn towards the respective ends 138, 142 so that the shutter 106 moves, against a tension in the springs 128, 130, 132, into its open position. It follows that, when the electromagnet 136 is de-activated, the shutter 106 moves, under action of the springs. 128, 130, 132 into its closed condition.

It will therefore be appreciated that selective drop ejection from the nozzle arrangement 102 can be achieved by having a suitable control system connected to the drive circuitry layer 36.

Figure 12:
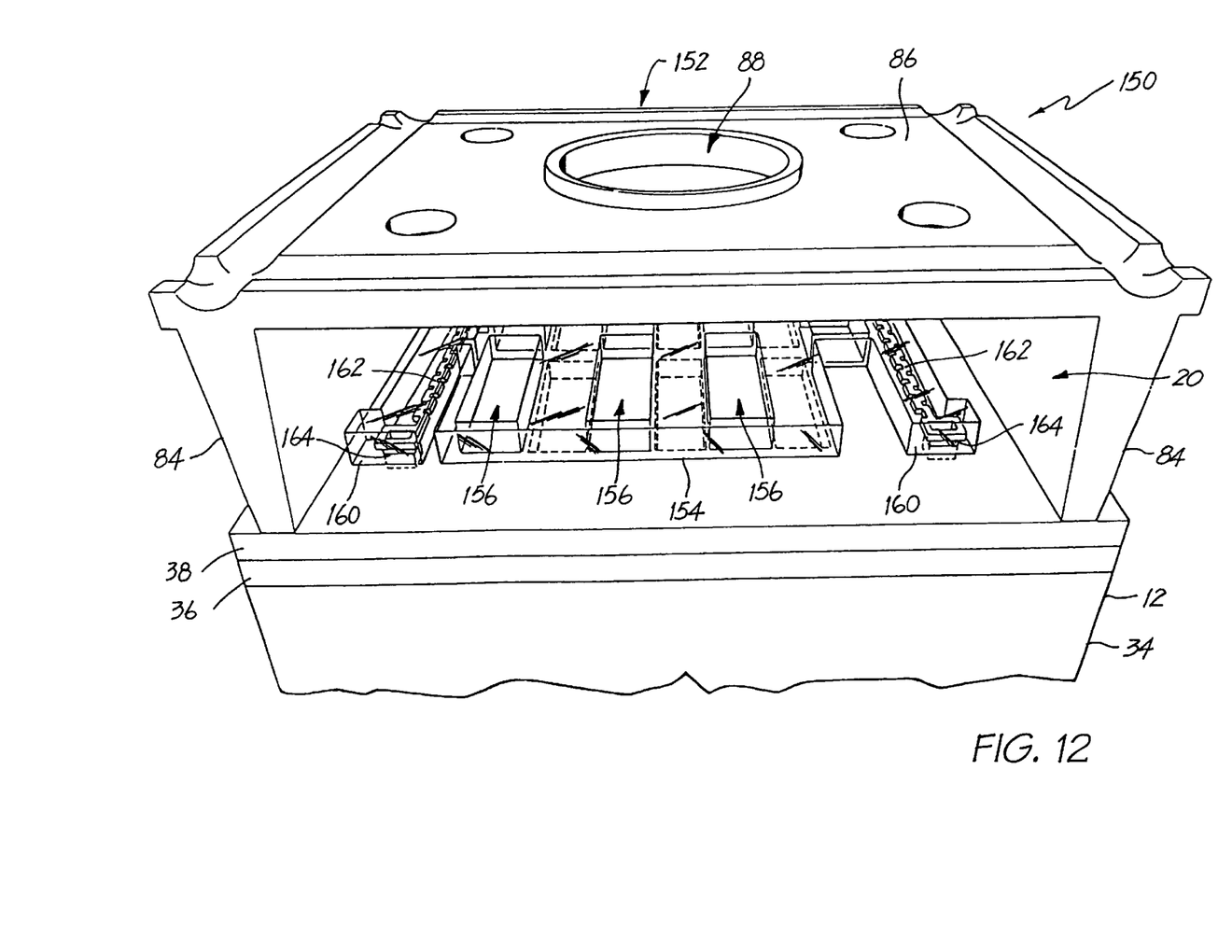
FIG. 12 shows a three dimensional view of part of a fourth embodiment of an ink jet printhead, in accordance with the invention, with a closure mechanism of a nozzle arrangement in a closed condition.
Figure 13:
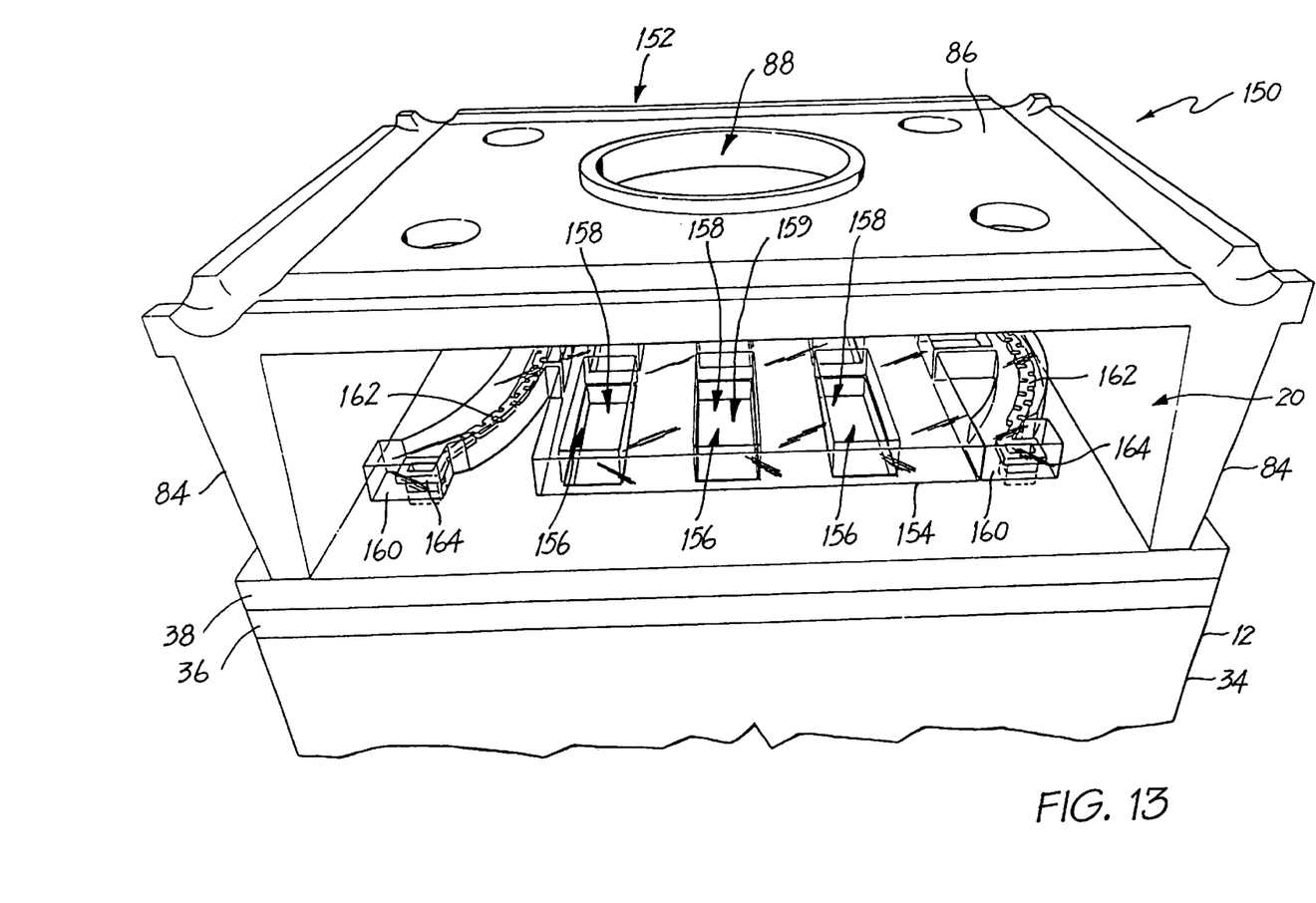
FIG. 13 shows the nozzle arrangement of FIG. 12 with the closure mechanism in an open condition.

In FIGS. 12 and 13, reference numeral 150 generally indicates a fourth embodiment of part of a printhead, in accordance with the invention. With reference to FIGS. 1 to 11, like reference numerals refer to like parts, unless otherwise specified.

The configuration of a nozzle arrangement 152 of the printhead 150 is similar to that of the nozzle arrangement 82.

However, a shutter 154 of the nozzle arrangement 152 has a number of shutter openings 156 defined in the shutter 154. Further, the inlet 22 is defined by a number of inlet openings 158. Each inlet opening 158 corresponds with a shutter opening 156. The shutter 154 is displaceable between a closed condition as shown in FIG. 12 and an open condition as shown in FIG. 13. As can be seen in these drawings, when the shutter 154 is in its closed condition, the shutter openings 156 and the inlet openings 158 are out of register with each other. Further, when the shutter 154 is in its open condition, the shutter openings 156 and the inlet openings 158 are in register with each other.

The ink inlet openings 158 are in fluid communication with an ink channel 159 etched through the wafer substrate 34. The ink channel 159 is in fluid communication with the ink reservoir 14 so that the pressure transducer 30 can pressurize ink within the nozzle arrangement 152.

The nozzle arrangement 152 included a pair of elongate actuating members 160. One actuating member 160 is positioned on each side of the shutter 154 and is connected, at a central region, to the shutter 154. Ends of the actuating members are fast with the passivation layer 38.

Each actuating member 160 is of a material which has a coefficient of thermal expansion such that, when the material expands on the application of heat, such expansion is capable of being harnessed to perform work. A heater element 162 is positioned in each actuating member 160 to extend a length of the actuating member 160. The heater elements 162 are connected to the drive circuitry layer 36 with vias 164. The heater elements 162 are configured so that they are capable of heating the material of the actuating members 160 to an extent sufficient to cause expansion of the material. It will be appreciated that since the actuating members 160 are fast with the layer 38, at their ends, this expansion causes buckling of the actuating members 160. The heater elements 162 are positioned in each actuating member 160 so that buckling of the actuating members 160 takes place in the same direction, thereby displacing the shutter 154.

As can be seen in FIG. 12, the actuating members 160 and the shutter 154 are configured so that, when the actuating members 160 are at rest, the shutter 154 is in its closed condition. As can be seen in FIG. 13, when the actuating members 160 are buckled, the shutter 154 is displaced into its open condition. De-activation of the heater elements and subsequent cooling of the material results in the actuating members 160 returning to their normal state with the result that the shutter 154 returns to its closed condition.

It will thus be appreciated that selective drop ejection from the nozzle arrangement 152 can be achieved by having a suitable control system connected to the drive circuitry layer 36.

A particular advantage of this invention is that the driving pressure behind every drop of ink is generated by the pressurizing mechanism 26 for all nozzle arrangements of the printhead. This results in a substantial saving of energy, given the high number of nozzle arrangements in the printhead. Providing the driving pressure throughout the ink reservoir obviates the need to generate a moving force separately within each nozzle chamber. It will be appreciated that moving a shutter is significantly easier to achieve within a nozzle chamber than physically ejecting the ink from the nozzle chamber.

A further advantage of the present invention is that a consistent ink moving pressure can be supplied to each nozzle arrangement. It will be appreciated that this can be difficult to achieve when separate ink movers are provided.

I claim:

1. An ink jet printhead that is manufactured in accordance with an integrated circuit fabrication technique, the ink jet printhead comprising:
    a wafer substrate;
    a drive circuitry layer positioned on the wafer substrate; and
    a plurality of nozzle arrangements positioned on the wafer substrate and the drive circuitry layer, each nozzle arrangement comprising:
        nozzle chamber wall% that define a nozzle chamber having an inlet that is in fluid communication with a pulsed ink supply from an ink reservoir;
        an actuator; and
        a shutter which is connected to the actuator, the actuator being electrically connected to the drive circuitry layer to receive control signals from the drive circuitry layer, the actuator being operable upon receipt of a signal from the drive circuitry layer to displace the shutter from a closed position in which the shutter closes the inlet of its associated nozzle chamber and an open position in which ink from the reservoir is in fluid communication with ink in the nozzle chamber.

2. An ink jet printhead as claimed in claim 1, in which a pressurizing mechanism is operatively arranged with respect to the ink reservoir, the pressurizing mechanism being configured to pressurize ink within the reservoir in a pulsed manner to generate pressure pulses to eject ink from the nozzle chambers on operation of the pressurizing mechanism, when the closure mechanisms are in the open condition.

3. An ink jet printhead as claimed in claim 2, in which the pressurizing mechanism is configured to generate the pressure pulses at a predetermined frequency.

4. An ink jet printhead as claimed in claim 3, in which the pressurizing mechanism includes a pressure transducer that is positioned in the reservoir and is connected to a control device for controlling operation of the pressure transducer.

5. An ink jet printhead as claimed in claim 3, in which each closure mechanism is configured to cooperate with the pressurizing mechanism to move into its open condition for the duration of a pressure pulse when ink is to be ejected from its associated nozzle chamber.

6. An ink jet printhead as claimed in claim 5, in which the nozzle arrangements are the product of a deposition and etching process carried out on the wafer substrate.

7. An ink jet printhead as claimed in claim 6, in which the nozzle chambers are defined in the wafer substrate as a result of an etching process carried out on the wafer substrate.

8. An ink jet printhead as claimed in claim 1, in which each inlet of the nozzle arrangements is defined by a number of inlet openings formed in the substrate, with its associated shutter defining a number of corresponding openings, the shutter and the inlet being positioned so that, when the shutter is in its open position, the shutter openings and the inlet openings are in register with each other and when the shutter is in its closed position, the openings are out of register with each other.

9. An ink jet printhead as claimed in claim 1, in which a roof wall is positioned on the nozzle chamber walls of each nozzle arrangement, at least one ejection port being defined in each roof wall.

10. An ink jet printhead that comprises
    a wafer substrate;
    a drive circuitry layer positioned on the wafer substrate;
    an ink reservoir arranged on the wafer substrate;
    a plurality of nozzle arrangements positioned on the wafer substrate and the drive circuitry layer, each nozzle arrangement comprising
        nozzle chamber walls that define a nozzle chamber having an inlet that is in fluid communication with the ink reservoir;
        an actuator; and
        a shutter which is connected to the actuator, the actuator being electrically connected to the drive circuitry layer to receive control signals from the drive circuitry layer, the actuator being operable upon receipt of a signal from the drive circuitry layer to displace the shutter from a closed position in which the shutter closes the inlet of its associated nozzle chamber and an open position in which ink from the reservoir is in fluid communication with ink in the nozzle chamber; and a pressurizing mechanism that is operatively arranged with respect to the ink reservoir, the pressurizing mechanism being configured to pressurize ink within the reservoir in a pulsed manner to generate pressure pulses to eject ink from the nozzle chambers on operation of the pressurizing mechanism, when the shutters are in the open position.

* * * * *